US005331158A

United States Patent [19]

Dowell

[11] Patent Number: 5,331,158

[45] Date of Patent: Jul. 19, 1994

[54] METHOD AND ARRANGEMENT FOR TIME OF FLIGHT SPECTROMETRY

[75] Inventor: Jerry T. Dowell, Portola Valley, Calif.

[73] Assignee: Hewlett-Packard Company, Palo Alto, Calif.

[21] Appl. No.: 988,043

[22] Filed: Dec. 7, 1992

[51] Int. Cl.[5] ........................ B01D 59/44; H01J 49/00

[52] U.S. Cl. .................................... 250/287; 250/282; 250/285

[58] Field of Search ............... 250/282, 287, 285, 423, 250/427

[56] References Cited

U.S. PATENT DOCUMENTS

| | | | |
|---|---|---|---|
| 3,668,384 | 6/1972 | Moorman et al. | 250/287 |
| 3,831,026 | 8/1974 | Powers | 250/285 |
| 3,849,656 | 11/1974 | Wallington | 250/427 |
| 3,886,365 | 5/1975 | Kruger et al. | 250/423 |
| 5,015,848 | 5/1991 | Bomse et al. | 250/281 |

*Primary Examiner*—Bruce C. Anderson

[57] ABSTRACT

The apparatus and method of the present invention multiplexes or gates particle beams to provide continuous data collection useful in time-of-flight mass spectrometry. The multiple particle beams are gated or combined to achieve an overall 100% duty cycle. This allows continuous data collection, thereby realizing the full advantages of abundance sensitivity and mass resolution in time-of-flight mass spectrometry.

14 Claims, 4 Drawing Sheets

METHOD AND ARRANGEMENT FOR TIME OF FLIGHT SPECTROMETRY

BACKGROUND

The present invention is directed toward the technical field of time-of-flight (TOF) mass spectrometers and, more particularly, toward the improvement of duty cycle performance in TOF mass spectrometry.

In the publication, "The Ideal Mass Analyzer: Fact or Fiction?," *International Journal of Mass Spectrometry and Ion Processes*, Vol. 76, p125–237 (1987), which is incorporated herein, author Brunée discusses the birth of time-of-flight mass spectrometry during the 1950's. Time-of-flight mass spectrometry was at first predominantly used in the study of fast reactions. As time-of-flight mass spectrometers operate at very high scanning speed, data from spontaneous reactions can effectively be recorded at the very high rates of the explosions themselves, e.g. 10,000 mass spectra per second or more. Even though time-of-flight techniques were accordingly used in the past to study fast reactions such as explosions, other applications of this technique were neither widespread nor plentiful.

In fact, it was not until the late 1970's, when plasma desorption techniques were first applied to TOF mass spectrometry as described by Macfarlane, (see for example Brunée at page 151) that TOF mass spectrometry began to show promise in the analysis of high mass molecules. In particular, Macfarlane showed that high-mass molecules could be efficiently ionized and detected as well as low mass molecules.

As is now generally known, in TOF mass spectrometry, ionizing a sample provides a start impulse for the time measurement. The resulting ions are separated by their flight times and recorded using pulse counting techniques. The output of a multi-stop time-to-digital converter then provides a direct measure of the corresponding mass.

In ideal circumstances, all of the ions generated during TOF mass spectrometry operation are detected thereby avoiding detection losses due to scanning from mass to mass as in the case of quad and sector instruments. Conventionally, the plasma desorption TOF technique is combined with a liquid chromatograph for the identification of high molecular weight compounds as well as for elemental trace analysis of solids. Theoretically, there is no detection limit with respect to mass range analysis. Mass separation is solely dependent on flight time, while scanning and recording speeds depend solely on cycle and flight time.

This variant of time-of-flight mass spectrometry has however generally shown only limited sensitivity with small sample amounts. Furthermore, ionization efficiency drops considerably with increasing molecular weight. As heavy molecules need a higher density of energy for their ablation than available by plasma desorption time-of-flight techniques, mass range and resolution have been limited.

Attempts to increase mass resolution have met with little success. In the publication, "The Renaissance of Time-Of-Flight Mass Spectrometry," *International Journal of Mass Spectrometry and Ion Processes*, Vol. 99, pages 1–39 (1990), which is hereby expressly incorporated herein, authors Price and Milnes illustrate the many methods that have been attempted to improve the resolution. A common method of increasing the mass resolution, according to Price and Milnes, is reducing the velocity spread of the ions. Often, this is achieved by reflectron techniques under application of decelerating and reflecting fields. In an attempt to achieve mass-independent space and energy focusing, another method proposed is dynamic post-source acceleration. Kinsel and Johnston suggested using post-source pulse focussing as a method to improve resolution in linear time-of-flight mass spectrometry, while Muga applied the principle of velocity compaction to improve resolution in this work, Analytical Instruments, vol. 16, page 31 (1987).

The prior art methods referenced above are limited in their respective practical applications. Generally, mass resolution is gained by either deflecting, reflecting, or controlling the velocity of the particle spread. Conventional time-of-flight mass spectrometry apparatus further all employ similar means for stimulus. For example, single pulse ion sources establish time resolution in the ion transport to the detector. Conventional TOF spectrometers avoid overlap in flight times at the detector by making the scan repeat time (cycle time) at least as long as the flight time of the heaviest mass ion. This long cycle time coupled with the pulsed ion production time leads to a very small duty cycle and consequently very limited ion abundance sensitivity.

Furthermore, time-of-flight mass spectrometers are currently not fully compatible with all kinds of available ionizing sources. For example, a single chemical ionization source cannot be pulsed sufficiently rapidly for satisfactory resolution in normal operation of a TOF spectrometer. According to another ionization alternative, an electrostatic energy analyzer can be introduced between the ion source and a linear time-of-flight mass analyzer (TOFMA). This however improves resolution at the price of sensitivity.

Time-of-flight instruments are used in fields other than analytical and physical chemistry. Large research instruments have been built for the identification of high-energy particles in nuclear physics experiments. These instruments have also incorporated magnetic deflection. Time-of-flight instruments as applied to space-science studies are further especially useful in the analysis of solid particles.

Conventional time-of-flight mass spectrometry uses a single pulsed ion source to establish time resolution from the ion transport to the detector. The best duty cycle achievable using such systems is significantly less than 50%. Simply put, only a small fraction the sample is available for analysis. In situations in which a limited amount of the sample material is available, insufficient data is thus gathered adequately to study the ions.

What is accordingly needed is a time-of-flight mass spectrometry approach which enables maximum sensitivity, i.e. optimal use of the sample, prior to analysis.

SUMMARY OF THE INVENTION

The apparatus and method of the invention controls and/or directs gating of single or plural particle beams enabling substantially continuous data collection in time-of-flight mass spectrometry. Multiple particle ionization sources drive corresponding plural independent ion beams, or alternately, electrostatically switched beams address and drive several separate ion-formation regions in the same or different sample structure achieving 100% duty cycle. In particular, according to the invention, each of at least two ion beams or streams is directed toward a corresponding detector channel yielding an output signal in each channel indicative of masses detected. The production and detection of multiple signals permits ongoing analysis of the mass spectrum of selected samples under consideration during successive partial cycles of the beam amounting to an effective 100% duty cycle. The use of multiple detector channels provides continuous data collection over selected time periods, thereby permitting realization of the advantages of a multiplexed source in time-of-flight mass spectrometry.

DETAILED DESCRIPTION OF THE INVENTION

Figure 1:
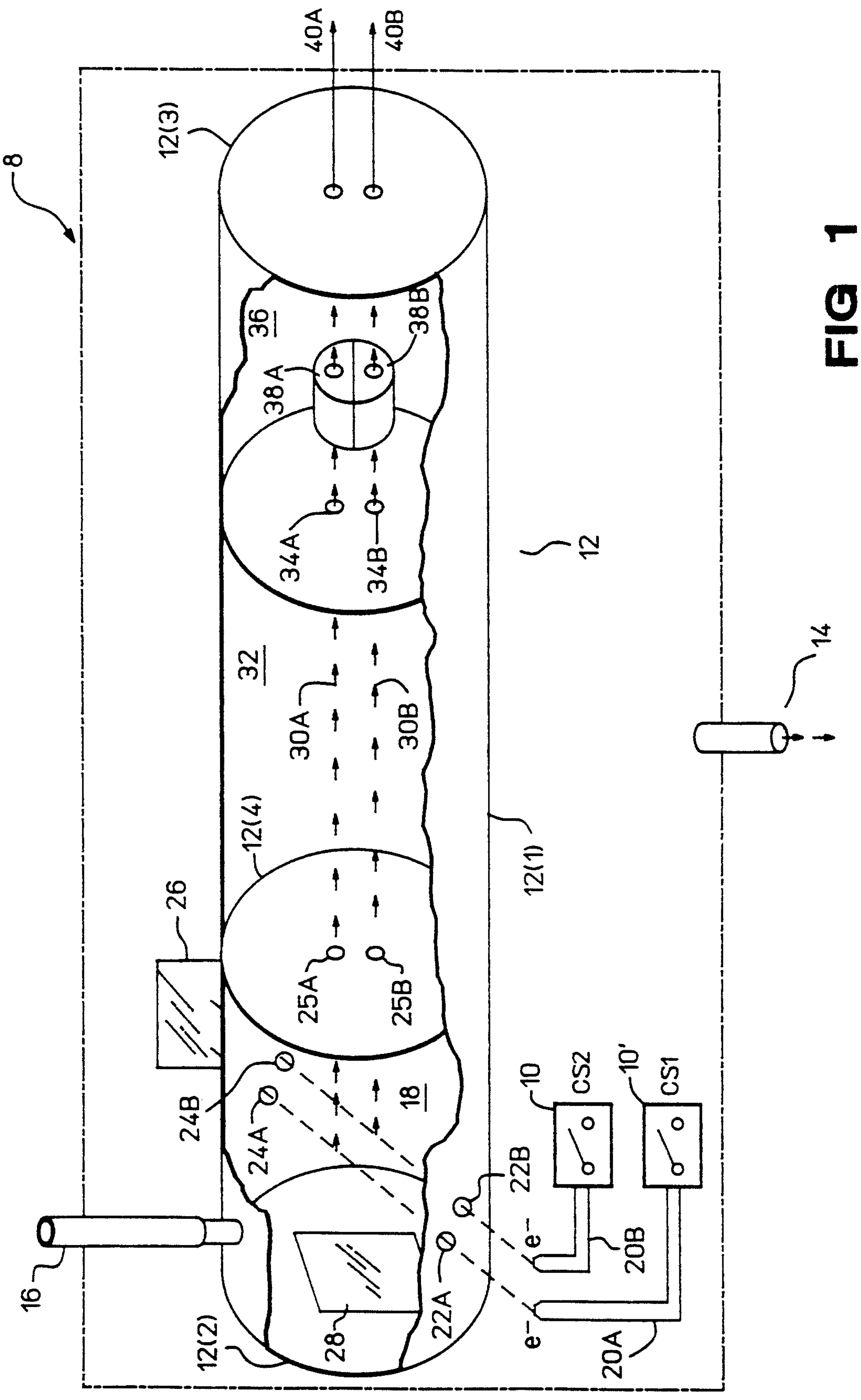
FIG. 1 shows a cut away schematic diagram of the present invention.

FIG. 1 shows an arrangement for time of flight mass spectrometry including time of flight mass spectrometer (i.e., TMS) device 12 in cooperative relationship with first and second electron ionization sources 10 and 10′ and collection plate 26. For containment of inner elements to be discussed in greater detail below, TMS device 12 includes a containment structure comprising outer walls 12(1) and first and second disk elements or end pieces 12(2) and 12(3). TMS device 12 is further internally divided into chambers to be described below, which are bounded by respective disk shaped barrier walls 12(4) and 12(5). As will be discussed, a first one of the indicated chambers includes a pusher plate 28 for propelling ions generated in the associated first chamber into an associated second chamber for reasons to be discussed.

Within an instrument casing 8, first and second electron sources 10 and 10′ are mounted adjacent to a time of flight mass spectrometer device 12 (hereinafter "TMS device 12") to provide a stream of electrons for production of ions within TMS device 12. More particularly, TMS device 12 is shown in FIG. 1 including an arrangement of chambers, respectively ionization chamber 18, drift region 32, and detector region 36. The containment of TMS device 12 is traversed for ingress and egress by respective input and output tubes 16 and 14.

In operation, TMS device 12 is first suitably evacuated through output tube 14 which extends into instrument casing 8 to withdraw gases initially found therein. The sample to be analyzed is introduced into the ionization chamber 18 via intake tube 16. The electron sources 10 and 10′ emit electron beams 20A and 20B respectively.

Electron beams 20A and 20B enter ionization chamber 18 through input apertures 22A and 22B. The electron beams exit the ionization chamber through output apertures 24A and 24B thus terminating at collection plate 26, which is mounted in the instrument casing 8 and external to TMS device 12. As the electron beams pass through the ionization chamber 18, the sample is charged. Pusher plate 28 pushes the ions out of the ionization chamber as ion beams 30A and 30B. Ion beams 30A and 30B pass from the chamber 18 to drift region 32 via exit apertures 34A and 34B. The ion beams travel through the drift region 32 entering the detection region 36 via exit apertures 34A and 34B. The ion beams 30A and 30B impinge on detectors 38A and 38B respectively. These detectors 38A and 38B are connected to detector channels 40A and 40B. These leads connect to external evaluation means such as pulse counters and a computer (not shown).

According to the invention, the instrument casing 8 is effective for mounting (according to a preferred embodiment) first and second electron sources 10 and 10′ and, in cooperation therewith the TMS device 12. In particular, TMS device 12 includes an outer containment 12(1), preferably constructed of a suitable sheet metal material fabricated into cylindrical or other tubular form, and further including two disk-like endpieces 12(2) and 12(3), respectively serving as input and output sides of the TMS device 12. The TMS device 12 is divided into three chambers: ionization chamber 18, drift region 32, and detector region 36. Ionization chamber 18 is bounded by outer containment 12(2), input endpiece 12(1), and wall 12(4). Drift region 32 shares as its sidewalls outer containment 12(1) and walls 12(4) and 12(5).

The shown preferred version is effective for producing pre-encoded electron and ion beams, respectively 20 and 30. The version of the invention shown in FIG. 1 indicates use of a pair of electron beams, 20A and 20B, in which encoding (or "pre-encoding) is accomplished by alternately switching electron beam sources 10 and 10′ on and off. This version is effective for producing a pair of corresponding ion beams 30A and 30B. In the single beam version of the invention, on the other hand, encoding of the electron beam is not accomplished immediately at the creation of the electron beam, but instead occurs in the ionization chamber 18, where the sample is introduced, ionized, and separate, periodic ion beams are generated therefrom, in a fashion as will be discussed in detail below. In short, the electron ionization source 10, according to the preferred mode of the invention, can be unitary or distributed. In other words, as will be discussed below, an alternate embodiment calls for use of a single source 10, thereby omitting source 10′ shown in FIG. 1.

The instrument casing 8 and the TMS device 12 are evacuated prior to introducing the sample into the system. The TMS device 12 is evacuated through evacuation tube 14 to create a vacuum. A sample is introduced via a vacuum system (not shown) into the intake tube 16 connected to the ionization chamber 18. The sample may come from a gas chromatograph or another suitable source. The sample is for example carried by the inert gas, such as helium, through the TMS device 12. Any other suitable inert gas would also make a satisfactory carrier. Ions from the carrier gas are later eliminated before detection, since they contribute substantial noise and severely limit the sensitivity of the spectrometer. One way of removing the carrier gas ions is using the magnetic field to further collimate the electron beams, having the additional function of deflecting the carrier gas ions away from the source exit slits or detectors. The heavier ions of interest that form the beams, because of their masses, are not deflected as much.

According to one preferred version of the invention, sources 10 and 10' produce two periodic electron beams 20A and 20B which are preferably out of phase (that is, one lags or leads the other), to a certain extent. According to one version, the respective beams may be out of phase by 180 degrees. However, it suffices for the invention to have them out of phase by only a small amount sufficient to to produce even overlapping, though partially staggered output ion beam(s). As a result, the electron beams 20A and 20B are suitably gated to provide an effective 100% duty cycle, as will be explained. In particular, the effect of such a complete 100% duty cycle is to produce a continuous data output to accomplish the optimized analysis of data from TMS device 12.

According to the preferred mode, electron beams 20A and 20B are applied perpendicularly to the intended direction of travel of the ions that are produced in the ionization chamber 18 and directed toward output apertures 24A and 24B by action of the pusher plate 28. The generated ion beams 30A and 30B exit via the output apertures 24A and 24B. FIG. 1 further shows injection ducts and fixtures for supplying sample materials, and separately for evacuating the ionization chamber 18 to the desired pressure level. However, many other orientations of beams 20A and 20B are considered workable.

The ion beams 30A and 30B are collimated prior to exiting the ionization chamber 18. Collimation may occur according to well-known techniques, as for example, by passing the beams through a series of charged plates (not shown) with defining apertures, thus creating a narrowed output of the ion beams. Other suitable ion optical systems for defining the output according to well known techniques may be employed, include lensing actions or end to end cylinders.

Figure 3A:
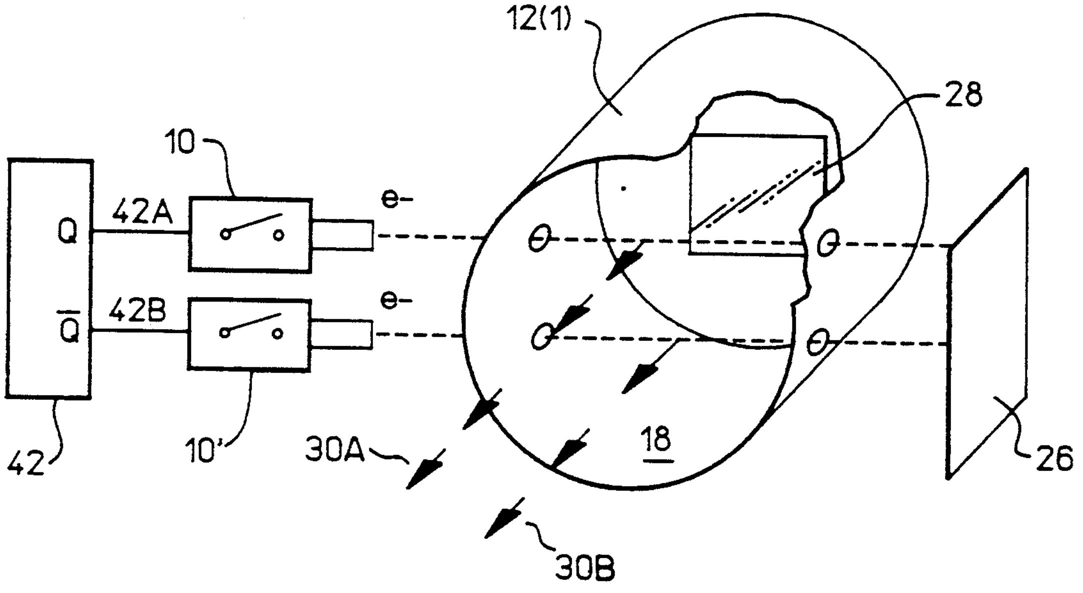
FIG. 3A illustrates a distributed electron source split generating two ion beams having a combined effective 100% duty cycle.
Figure 3B:
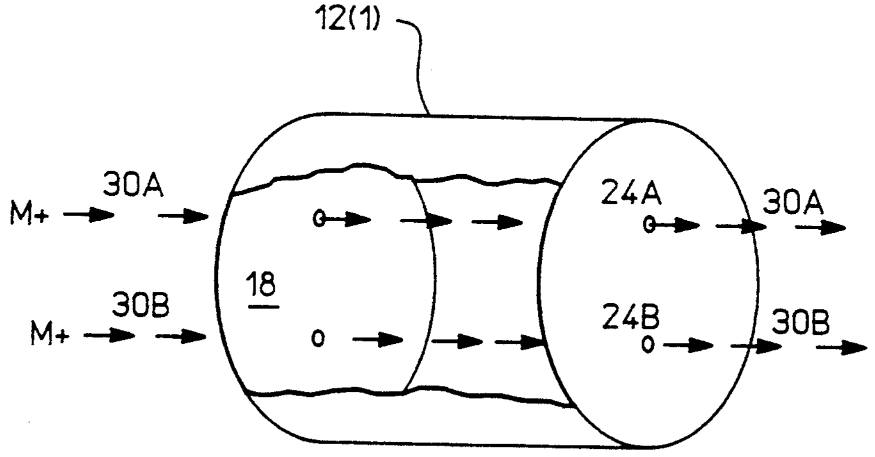
FIG. 3B illustrates a distributed ion source wherein the two ion beams are sequentially gated producing an effective 100% duty cycle.
Figure 4A:
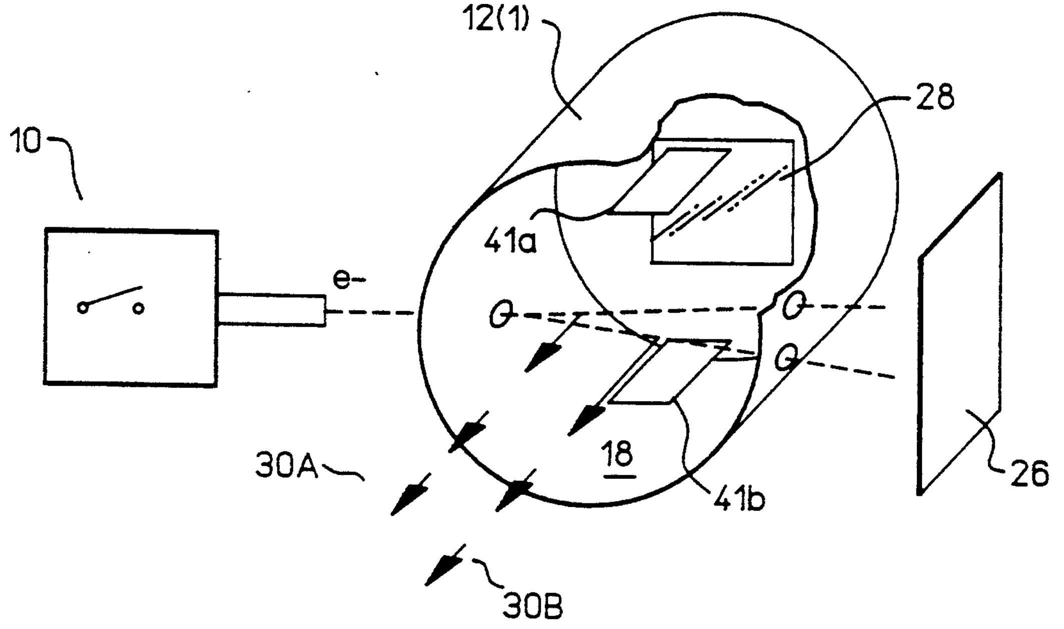
FIG. 4A illustrates a unitary electron source generating two ion beams.
Figure 4B:
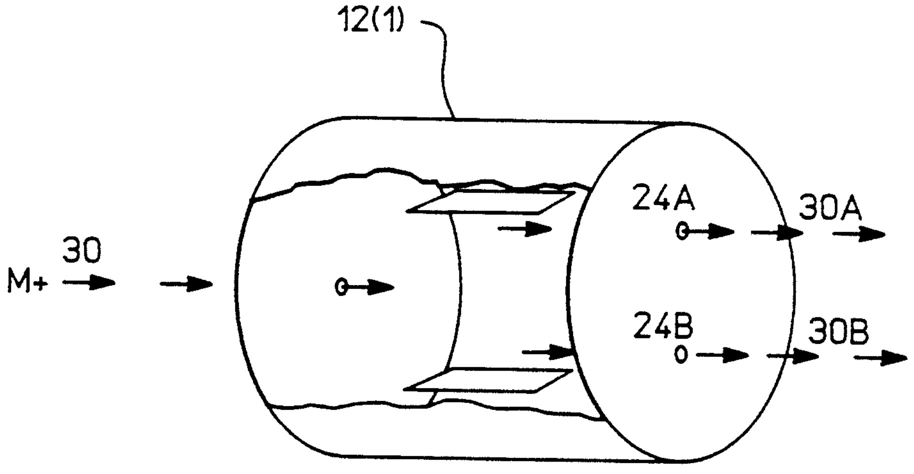
FIG. 4B illustrates a unitary ion source wherein two ion beams have been generated.

Each of ion beams 30A and 30B exits through corresponding output apertures 24A and 24B in wall 12(4) and as shown in FIGS. 3B and 4B, at the output end of the ionization chamber 18. Each of the resulting ion beams 30A and 30B then travels along a defined flight path within drift area 32 prior to reaching a corresponding ion detector, which according to the preferred embodiment, includes first and second electrically insulated and separate detector regions, respectively 38A and 38B. After the ion beams 30A and 30B have been detected by detectors 38A and 38B, spectral data is obtained effective for permitting characterization of ion beams representative of the injected sample, and this information is decoded and processed by well known data analysis equipment (not shown) connected at leads 40A and 40B. As already indicated, in decoding the data received, the spectrum of each ion beam is effectively determined. The spectra thus established may then further be evaluated to provide particular mass information about the sample analyzed. Ion beams 30A and 30B are encoded prior to or following their creation. This provides a time stamp from which to measure the resulting ion beams 30A and 30B, according to well-known time of flight mass spectrometry techniques.

As suggested above, ion beams 30A and 30B pass through apertures 24A and 24B having approximately 1-3 millimeters in diameter prior to entering drift area 32. Each of the ion beams 30A and 30B has a unique flight path within the drift area 32. The drift area 32 is approximately 1 meter in length. Although the drift area 32 is depicted linearly, well-known reflection techniques may be applied within a shorter drift area providing a flight path of equivalent length. While the present embodiment employs two beams, the method is easily extensible to include more than two beams to the beam gating sequence. The step of encoding includes but is not limited to techniques of chopping, bunching, or extending the flight path. Although a combined electron beam source and encoding unit is preferred, each function may be implemented separately. Although the figures disclose cylindrical housing for TMS device 12 for the mass spectrometer, the shape is merely a manufacturing convenience. Although the material used for TMS device 12 is non-magnetic stainless steel, the TMS device 12 may be constructed from metallized glass, or gold-plated aluminum, or titanium or any structurally suitable conductive material compatible with good vacuum practice.

The plates separating TMS device 12 into chambers are made of substances inert to the gases introduced into the mass spectrometer via a gas chromatograph, non-magnetic, and easily cleaned. Depending upon the sample materials to be tested, stainless steel or another suitable material may be chosen. In addition, the plates may be made of ceramic, sapphire, glass, or quartz which have been suitably metallized, and, where required, insulating structures can be of ceramic, sapphire, glass or polymers. The entire structure is evacuated prior to use and the system operates in a vacuum. The vacuum provides a free path for the ions to travel without interaction.

After acceleration and transport through drift region 32 of the time-of-flight mass analyzer 12, ion beams 30A and 30B strike or impinge preferably upon detectors 38, including first and second detector portions 38A and 38B, respectively. The detectors may be electron multipliers such as for example multi-channel plate (MCP). In the case of a preferred embodiment, detectors 38 preferably split in two segments, for example, according to products commercially available from the company, Galileo Electro-Optics. Other detector means include using a single metal plate as a unitary ion detector.

In operation, one ion beam 30A strikes one segment of split detector 38A in detection region 36 while the other beam 30B hits, strikes or impinges upon the second region 38B. When an ionized particle strikes the multi-channel plate, the particle sloughs off a quantifiable number of electrons. Hence, the multi-channel plate acts as an electron amplifier. Each detector segment 38A and 38B is connected to a separate data processing channel 40A and 40B that includes fast digitizers or fast multichannel scalars for pulse counting. The data processing channels 40A and 40B send the encoded spectrum information to a central processing unit (not shown), e.g. a computer, for decoding and analysis.

Every ion species has a unique spectrum or signature at high duty cycle or in continuous operation. Furthermore, each species contributes noise upon arrival at the detectors in proportion to its abundance. Whether a step can be discerned depends on the size of the step in relation to the size of the total ion signal at the time of the step and upon the time available for signal averaging between that step and the two adjacent steps (at earlier and later times).

The signal-to-noise ratio for any given ion depends on details of the entire mass spectrum. During the "on" cycle for each beam, the signal for a given ion is superimposed initially on the signals from all lighter ions, then in turn on those from heavier ions, whereas during the "off" cycle, the signal is superimposed on those from heavier ions until it cuts off.

One method of decoding is signal derivative evaluation. The signal derivative of each detector channel yields the mass spectrum during each half-cycle of the beam chopping. The mass of the ion corresponding to a step in the signal is related to the time $\tau$ that the step occurs after a beam transition approximately by $$M=2\tau^2 q\ V/L^2$$

where

M=mass of ion q=charge of ion

V=energy of ion

L=length of ion drift path.

If high accuracy is required, corrections may be calculated for the ion acceleration region. In practice, the signal processing algorithms would be selected to average the signal properly in order to determine the step sizes and positions with sufficient accuracy and with the best achievable signal-to-ratio. Other applicable methods include processing with maximum entropy, Bayesian inference techniques, or pseudo-random encoding with cross-correlation detection. After the detected ion beams have been decoded, the resulting spectrums can be further analyzed.

Figure 2A:
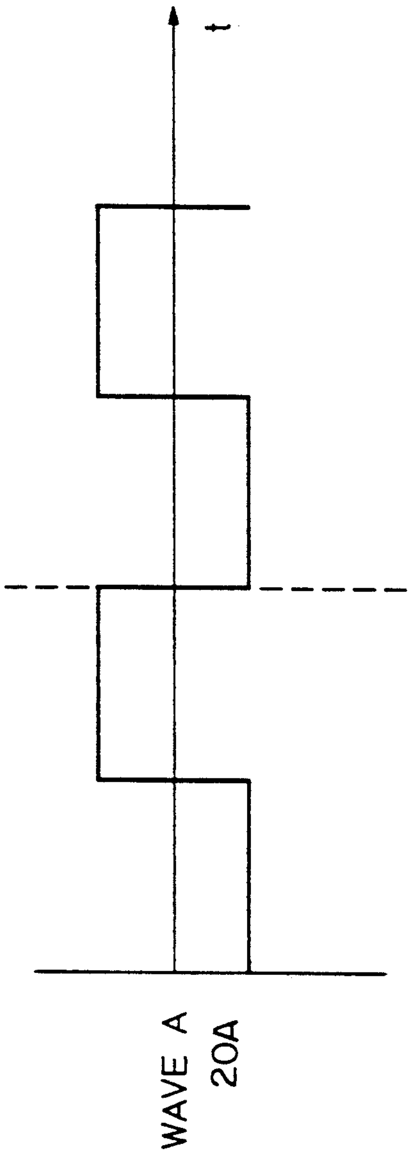
FIG. 2A illustrates a first simplified gating sequence with respect to time of the particle beams.
Figure 2B:
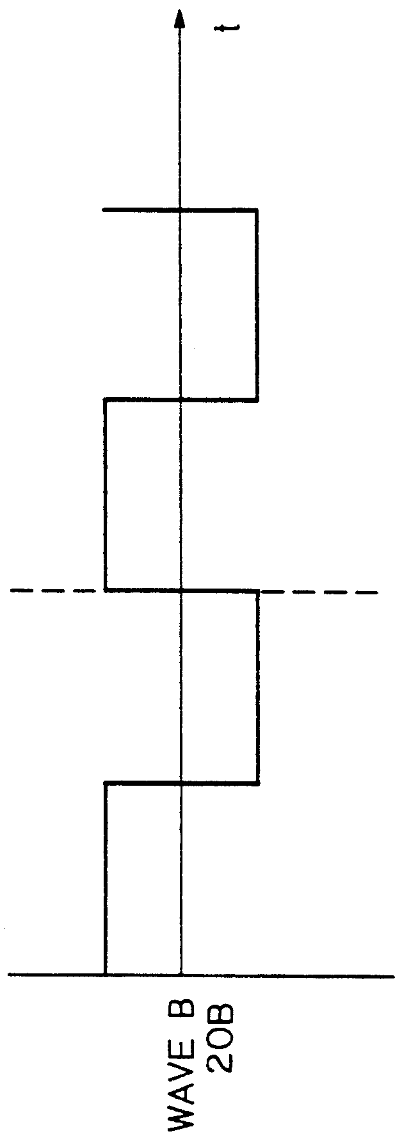
FIG. 2B illustrates a second simplified gating sequence with respect to time of the particle beams.

The electron beams 20A and 20B are gated or controlled such that the "on" time interval for each beam is equal or slightly greater than the flight time of the heaviest ion from the source to the detector. As shown in FIGS. 2A and 2B, the electron beams 20A and 20B are gated so that electron beam A 20A is a square wave and electron beam B 20B is a complementary square wave. Since there is no point in the duty cycle where both electron beams A and B be off, data collection is essentially continuous. Each electron beam can be gated on and off independently. The on/off transition can be made within nanoseconds. It then becomes possible to encode timing information into the ion transport without sacrificing duty cycle.

FIG. 3A shows a side view of the ionization chamber 18 detailing key features of one version of the invention. In particular, the version relying upon two electron sources are shown with the electron sources alternately gated using D-latch 42.

An input square wave clock signal having a desired period is for example applied to the input of latch 42. A selected period corresponding to the mass of the largest particle of interest is to be examined. In operation, the Q-output 42A of D-latch 42 is applied to first electron source 10, while the "not Q" output 42B of D-latch 42 is applied to the other electron source, namely source 10'.

Thus, two complementary electron beams 20A and 20B are applied to an input ion sample effectively generating a corresponding two complementary ion beams 30A and 30B by passing through the gaseous dispersion of injected sample gas flowing into ionization chamber 18. Although the beams have been depicted in FIG. 2A and 2B as symmetric complementary beams, the method is easily extensible to non-symmetric beams which are complementary such as in pseudo-random switching.

The electron beams 20 effective for ionizing the sample within ionization chamber 18 do not completely dissipate within the chamber, but, by virtue of their energy pass entirely through the chamber and out of its far side through apertures 12(1)' in the chamber containment wall 12(1). In particular, both electron beams 20A and 20B terminate at a collection plate 26 which according to well-known techniques are mounted within instrument casing 8.

The concept of the invention may be implemented by extension to the control of multiple, suitably alternately out of phase synchronized ion sources (as opposed to multiple electron sources in turn producing multiple ion beams), as suggested by the non-electron beam originating ion beams in FIG. 3B, or more than two electron sources by substituting the D-latch with combinational logic, a microprocessor, or even a relay system driving a suitable ion beam producing device such as for example a laser (not shown) suitably mounted within the instrument casing 8. Other approaches to producing plural ions beams independent of the particular modes specifically suggested above would readily be known to individuals skilled in the art.

FIG. 4A shows another version of the invention according to which a unitary electron source is used to generate two ion beams 30A and 30B, with the actual ion generation still essentially being continuous. In a preferred arrangement of this version, the effect of multiple gated distributed electron sources may be simulated from a unitary source by electrostatically or otherwise alternately deflecting the output of the unitary electron source into two different flight paths and hence, into two ion-generation regions. The electron beam passes between two short opposing electrodes 44A and 44B composed of conductive materials such as stainless steel. The electrodes 44A and 44B are suitably mounted, electrically controlled, and otherwise arranged according to well known techniques common to those skilled in the art. The physical length of the electrodes 44A and 44B in an axial direction along the axis of TMS device 12 corresponds to the "on" time interval for each beam 30 such that the segment deflected is equal or slightly greater than the flight time of the heaviest ion from the source to the detector 38. An alternating electric field, such as a square wave, may for example alternatingly be applied to respective indicated electrodes 44, for alternating or otherwise adjusting the polarity and field level of the electrodes 44. This controlling electric field scheme is effective for causing the electron beam 20 to be alternately transversely attracted to a different one of the electrodes 44A and 44B. As already noted, passing the alternating electron beam through the ion sample results in two complementary ion beams 30A and 30B.

Finally, as shown in FIG. 4B, a single ion beam 30, produced by any ionization source, may be used in place of the single electron beam of FIG. 4A, but this approach is enhanced by collimation features, as alluded to above, prior to being passed through the alternating electric field. For example, the ion beam 30 traverses a series of metal plates (not shown), positioned either within the ionization chamber 18 or external thereto. The potentials on these plates are chosen such as to provide the appropriate ion optical characteristics for proper collimation and focussing of the ion beams.

As is well-known, the graduated voltage differential of these plates restricts the particle spread in the ion beam. The beam is introduced 1-5 centimeters away from the start of the collimation region. The restricted ion beam passes between two short opposing electrodes 44A and 44B in the same fashion as in the electron beam embodiment. Thus, chopping or deflecting a continuous ion stream results in two complementary ion beams.

It is apparent that other gating sequences can be used, i.e. coding/correlation schemes of multiple electron beams prior to entering the ion formation region. Other schemes include using a magnetic field to steer or deflect the unitary electron or ion beam. Furthermore, particles aside from ion particles can be detected, such as subatomic particles. Possible electron beam sources include using a hot filament combined with collimating apertures and laser desorption. Possible ion sources include but are not limited to chemical ionization systems.

This method is easily extensible to other ionization sources such as laser beams, thermal generation, plasma extraction, photo-ionization, or field ionization as the means to generate ion beams. As shown in the drawings for purposes of illustration, the invention is embodied in a novel particle ionization source which provides gated multiple ionic outputs. There has been a need for an ionization source that generates an effective 100% duty cycle.

As shown in the exemplary drawings, an particle ionization source providing multiple particle beams, such as an electron or ion source, is used in a time-of-flight mass spectrometer. These multiple beams are sequenced to provide an effective 100% duty cycle. Schemes for providing multiple particle beams include using multiple electron beam sources, a single electron beam source which is alternately switched or deflected between several ion-formation regions or a combination thereof. These beam outputs are sequenced to provide an effective 100% duty cycle.

Although the present invention has been described in detail with reference to a particular preferred embodiment, people possessing ordinary skill in the art to which invention pertains will appreciate that various modifications and enhancements may be made without departing from the spirit and scope of the claims that follow.

What is claimed is:

1. A time-of-flight arrangement comprising:
- excitation means for establishing a first and a second ionizing particle beam, each ionizing particle beam having an on and an off state, wherein the second ionizing particle beam is switched to the on state when the first ionizing particle beam is in the off state and the first ionizing particle beam is switched to the on state when the second ionizing particle beam is in the off state;
- encoding means adjacent said excitation means, said encoding means for establishing timing signatures within the first and second ionizing particle beams;
- an ionization chamber for holding a sample, positioned adjacent said encoding means, receiving the first and second ionizing particle beams containing the timing signatures, whereby the first and second ionizing particle beams ionize the sample to produce a directed plurality of encoded ion streams;
- a drift region receiving the directed plurality of encoded ion streams, the drift region adjacent the ionization means; and
- a plurality of detectors respectively associated with at least a pair of encoded ion streams, adjacent the drift region such that each of said plurality of detectors detects a corresponding one of said plurality of encoded ion streams.

2. The time-of-flight arrangement as claimed in claim 1, wherein said plurality of detectors produces indications representative of the masses and quantities of ions in the detected encoded ion streams.

3. The time-of-flight arrangement as claimed in claim 2 further comprising signal processing means for analyzing the indications produced by said plurality of detectors.

4. The time-of-flight arrangement as claimed in claim 1, wherein the excitation means comprises multiple particle sources.

5. The time-of-flight arrangement as claimed in claim 1, wherein the excitation means comprises:
- a single particle source; and
- means for switching the single particle source such that the first and second ionizing particle beams are produced.

6. The time-of-flight mass analyzer as claimed in claim 1 further comprising gating means for controlling the time sequencing of said plurality of particle beams produced in said excitation means.

7. A method for data collection using time-of-flight spectrometry comprising:
- sequentially gating a first and a second ionizing particle beam such that each ionizing particle beam has an on and an off state, wherein the second ionizing particle beam is switched to the on state when the first ionizing particle beam is in the off state and the first ionizing particle beam is switched to the on state when the second ionizing particle beam is in the off state;
- encoding the first and the second ionizing particle beams by establishing timing signatures within the ionizing particle beams;
- ionizing a sample by the first and second encoded ionizing particle beams to produce a directed plurality of encoded ion streams;
- drifting by the directed plurality of encoded ion streams; and
- individually detecting each of said directed plurality of encoded ion streams.

8. The method for data collection using time-of-flight spectrometry as in claim 7, said step of sequentially gating comprising splitting a single particle beam into said plurality of excitation beams.

9. The method for data collection in time-of-flight spectrometry as in claim 8, said step of splitting comprising deflecting said single particle beam into at least two ion-generation regions.

10. The method of data collection in time-of-flight spectrometry as in claim 8, said step of splitting comprising alternately deflecting said single particle beam into at least two different flight paths.

11. The method of data collection in time-of-flight spectrometry as in claim 7, further comprising the step of eliminating undesirable species prior to said step of detecting.

12. The method of data collection useful in time-of-flight spectrometry as in claim 11, said step of eliminating comprising applying an electromagnetic field for deflecting undesirable species away from a detecting region.

13. The method of data collection in time-of-flight spectrometry as claimed in claim 7, said step of detecting comprising:
- producing indications of each of said directed plurality of encoded ion streams; and evaluating said indications to determine the masses and quantities of ions in detected ion streams.

14. A method of data collection in time-of-flight spectrometry comprising:

sequentially gating a first and a second ionizing particle beam such that each ionizing particle beam has an on and an off state, wherein the second ionizing particle beam is switched to the on state when the first ionizing particle beam is in the off state and the first ionizing particle beam is switched to the on state when the second ionizing particle beam is in the off state;

encoding the first and the second ionizing particle beams by establishing timing signatures within the ionizing particle beams;

ionizing a sample by the first and second encoded ionizing particle beams to produce a directed plurality of encoded ion streams;

eliminating unwanted species said plurality of encoded ion streams;

drifting by the directed plurality of ion streams;

individually detecting the plurality of encoded ion streams;

producing indications representative of the masses and quantities of ions in the plurality of encoded ion streams; and evaluating said indications to determine the masses and quantities of ions in detected ion streams.

* * * * *